May 24, 1938.  E. F. HATHAWAY  2,118,198
GLARE SHIELD
Filed March 16, 1937   2 Sheets-Sheet 1

Inventor:
Edgar F. Hathaway,
by Emery, Booth, Townsend, Miller & Widner
Att'ys

May 24, 1938.  E. F. HATHAWAY  2,118,198
GLARE SHIELD
Filed March 16, 1937   2 Sheets-Sheet 2
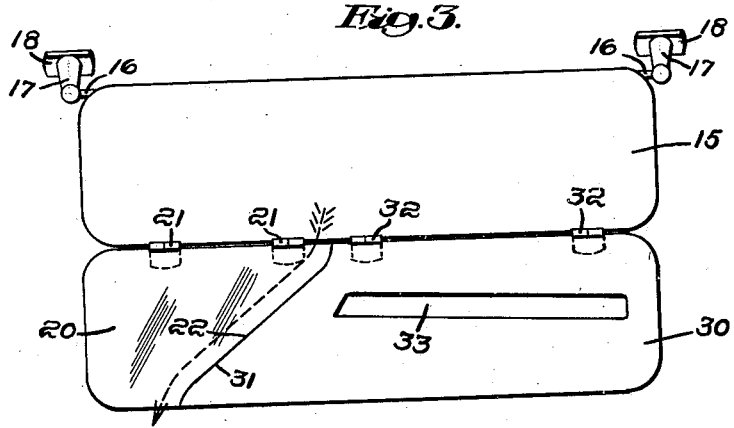
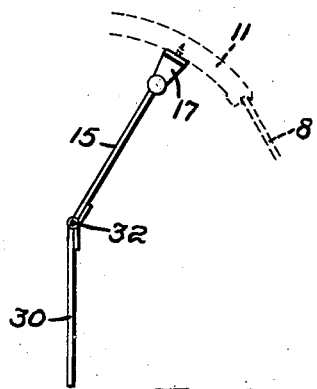
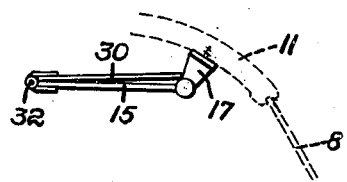
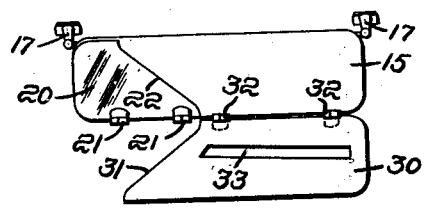
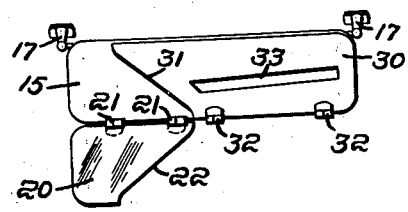
Inventor:
Edgar F. Hathaway,
by Emery, Booth, Townsend, Miller & Weidner
Attys Patented May 24, 1938

2,118,198

UNITED STATES PATENT OFFICE 2,118,198

GLARE SHIELD

Edgar F. Hathaway, Wellesley, Mass.

Application March 16, 1937, Serial No. 131,171

2 Claims. (Cl. 296—97)

My present invention relates to the avoidance of objectionable glare effects on the eyes of operators of motor vehicles, including such effects as are caused by indirect or reflected glare. More particularly the invention aims to provide improved means for the purpose stated, either as standard equipment or by way of attachment, replacement or accessory devices, which may be of simple and inexpensive construction but of increased efficiency and convenience in connection with both night and day operation of automobiles and motor vehicles.

In the drawings, illustrating by way of example one embodiment of my invention,

Fig. 3 is an elevation, on a larger scale, of the glare shield or device of Figs. 1 and 2, in similar position as in said figures;

Figs. 4 and 5 are side elevations, on the scale of Fig. 3, showing the device in one operative position, and in inoperative or non-use position, respectively;

Fig. 6 is a rear view of said device, on a similar scale as in Fig. 1, illustrating another operative position of the same, more particularly for daylight driving under bright light conditions; and Fig. 7 is a view similar to Fig. 6, illustrating a further operating position of the device, with particular reference to night driving.

The difficulties occasioned to motor vehicle operators by glare are well recognized but so far as I am aware no adequate, simple and convenient means has heretofore been provided for correcting these difficulties under all the different driving conditions. The glare effects may be those of direct sunlight, as when a car is being driven toward the sun on a bright day. These effects become particularly annoying and dangerous in the early morning and late afternoon when the operator is facing directly into the low sun. Such direct glare is frequently increased, often to the point of substantial blinding, by reflected glare. This indirect or reflected glare comes sometimes from the road and other surfaces apart from the vehicle but comes especially from bright surfaces at the front portion of the automobile, particularly the engine hood, lamps, radiator and ornaments. This type of glare has become even more pronounced in connection with present day automobiles by reason of the brilliance and luster of their body finish and the stainless or bright character of their chromium or other metal trimmings and exterior body hardware. Another type of extremely objectionable glare is that occasioned at night by the headlights of approaching vehicles.

Glare difficulty of the direct type has been reduced to some extent in the modern cars, by the provision of interior sun vizors supported at a level above the windshield and arranged to depend toward the usual line of sight. Efforts have also been made to overcome headlight glare, largely by control at the light sourse, or by supplying translucent accessories of one sort or another. But nothing has been devised so far as I am aware to remedy the effects of glare of the reflected type, nor has there been provided any simple and unitary means adequately to counteract glare of all three types above referred to, namely, direct daylight, indirect or reflected daylight, and headlight or night glare. It is the main object of my invention to supply such unitary device or means, and which may be instantly available and readily adjustable for any of the conditions named and may be retained in out-of-the-way position when not desired for use.

Figure 1:
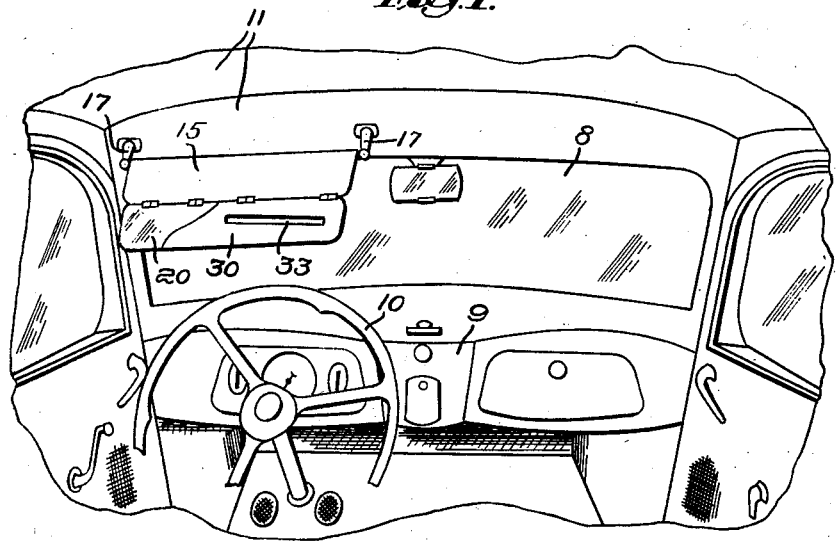
Fig. 1 is an interior view of the driver's compartment or front seat of a motor vehicle, in this instance an automobile of the modern closed type, looking forward, showing, in one operative position, an anti-glare device representative of the invention.
Figure 2:
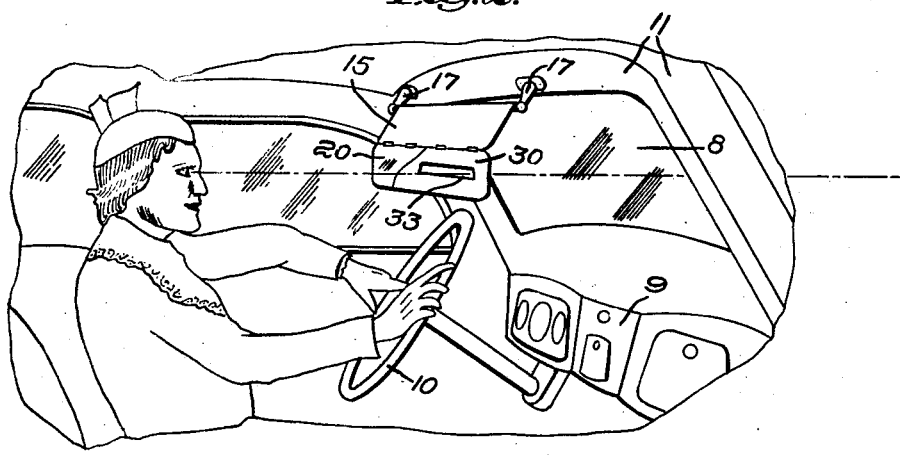
Fig. 2 is a view similar to Fig. 1, but looking from the curb, off-traffic or right side of the vehicle.

Referring now to the drawings in more particular and first to Figs. 1 and 2, I have there illustrated interior portions of the driver's compartment of a motor vehicle, in this instance of the passenger type, sufficiently to give an understanding of the invention. Said portions include mainly the windshield 8, instrument panel 9, steering wheel 10 and roof 11 including the header strip or panel intermediate the windshield and the more horizontal portion of the roof. In automobiles of modern design and streamlining such header strip generally is carried by or is a part of the front sloped portion of the roof, and the same is true of the stationary sections at the car sides above the doors or windows. Accordingly the term "roof" as herein used in connection with the location or point of support for the anti-glare device of my invention will be understood as including any available supporting space or part for presenting the device in the desired shielding relation to the driver's eyes.

The device or apparatus of the invention comprises a main or supporting element 15. In the illustrated embodiment I utilize as such element an interior sun vizor which may be similar in general to those now used on the majority of modern cars. It comprises a light-obstructing and generally opaque strip or panel, of substantial rigidity, being commonly formed of a metal or other plate felted or otherwise covered to harmonize with the car upholstery. This supporting element 15, shown in the form of a sun vizor, is mounted for vertical swinging movement about an axis at or adjacent and parallel with its upper or front edge, in the illustrated instance by means of end pivots 16, see Fig. 3, having a tight, holding fit in posts 17 removably or otherwise held by sockets or the like 18 on the automobile roof. The pivotal mounting for the vizor preferably is such that the vizor will stand in any position to which it is moved, for use or for storage.

The sun vizor or supporting element 15, in the illustrated embodiment, serves to carry, adjustably, complementary means for affording with the element 15 substantially complete glare protection, under any given driving conditions.

At the outboard or approaching-traffic side, the left in the case of a left-hand drive vehicle as shown, I provide a shield member 20 of semi-transparent or translucent material adapted to obstruct partially, filter or screen light rays received by it. It may be formed of any suitable material such as glass or a cellulosic or other composition of a non-clear or darkened character, color or hue, for example amber or green, adapted to transmit only a subdued light, comfortable to the driver's eyes.

This shield member or element 20 is primarily for night driving, to protect against headlight glare. It need have but the comparatively small area which is adequate for that purpose and may be variously shaped and proportioned. In the form shown it is constructed to conform in general to the outboard or left lateral portion of the vizor 15, so that it may be turned up flatwise toward or against the latter when it is not desired for use, as in Figs. 5 and 6. For this and other purposes including that of adjustment said translucent member 20 is hinged at its upper portion to the lower portion or edge of the support or vizor 15, as by one or more hinges 21, 21 preferably symmetrically disposed along the member 20. Such hinge connection is desirably of the position-holding or non-positive-locking type, so that the shield member 20 and the vizor or support 15 will stand at any angle relative to each other to which they are adjusted.

The lateral or vertical edges of the shield member 20 may be parallel or otherwise, but preferably the inboard or right edge has a contour substantially as illustrated, following approximately the path traced by a headlight beam of a car approach along a fairly straight section of a highway. A given beam under such condition which enters the field of the translucent member 20 at the upper inboard corner, for example, and continuing as the cars approach and pass, will trace a path substantially as indicated by the dotted arrow of Fig. 3, and said member is shown as shaped accordingly at its inboard edge 22, thus reducing the area of said member. If the latter and the driver's eyes are so relatively positioned that a headlight beam enters the field of the translucent member at the point where the arrow enters, then the glare-shielding effect will be continued throughout the approach and passing of the light-carrying automobile, leaving a maximum totally unobstructed field of vision open to the driver. By slightly shifting his position, or that of the shield member, the driver may readily take care of any glare condition due to approach relative to headlights or other light sources along or adjacent a highway.

At the inboard, curb or right lateral portion of the vizor or supporting element 15 I provide further glare-shielding means indicated as a whole by the numeral 30, said means having the primary purpose of protecting against daytime conditions of glare, both of the direct or indirect or reflected types. As herein illustrated, said means comprises a plate-like shield or shielding element 30, preferably constructed, proportioned and arranged to complement the semi-transparent shield 20, so as to form when used with the latter a unitary and substantially continuous or uninterrupted shield or panel below the supporting element or vizor 15.

This shielding member 30 may be constructed of any suitable sheet material which is opaque or sufficiently light-obstructive adequately to shield and protect the driver's eyes against glare effects such as previously referred to, including particularly those from the low sun and those reflected from the automobile hood and other parts. It may be of a construction, for example, generally similar to that of the vizor 15. The term "opaque" as herein used with reference to this member is intended to include not only opacity but also such less-than-opaque character as will adequately shield against glare effects, said term being used mainly to distinguish from the character of the previously described semi-transparent shield member 20. In some instances the light-screening or light-transmitting values of these two shield members need not be substantially different.

As stated, said opaque inboard shield member 30 desirably but not necessarily has a contour at its outboard or left edge 31 conforming to and complementing the adjacent edge 22 of the other member. It may be similarly supported, herein by connection along its upper portion to the lower portion or edge of the vizor or supporting element 15, as by one or more hinges 32, 32. These hinges also desirably are of the position-holding type as previously referred to, so that the shield member 30 and the supporting member 15 may be adjusted to and will remain in any relative angular position, including use positions such for example as in any of Figs. 1 to 4 and Fig. 6 or a non-use or out-of-the-way position as in Fig. 5 or 7.

The opaque or substantially opaque shield member 30 is constructed and arranged to stand directly in front of the driver's eyes and to extend below their level. Therefore, to afford driving vision, it is provided with a window or vision slot 33 of adequate size to enable the driver to look through the shield 30 sufficiently for ordinary driving purposes. Obviously the field of view thus afforded will depend on the size and shape of the window 33 and the distance of the shield from the driver's eyes. In most motor vehicles and with a mounting such as illustrated this distance is comparatively short, generally between 1 and 2 feet. Hence for most installations I find that a height of between ¼ inch and 1 inch is entirely adequate. I have also determined that a convenient width or lateral extent for the window is approximately that of the distance between the human eyes, which interpupilary distance has been found to average between 3 and 4 inches. In a device such as here illustrated a vision slot of from 3 to 6 inches in length will adequately serve the purposes of my invention. It will be understood, however, that the dimensions named are by way of example only and that they may be varied to suit particular conditions.

From the foregoing it will be apparent that the invention provides glare-shielding or anti-glare means constructed and arranged to take care of substantially any glare conditions which may be met in the operation of present day motor vehicles. For some positions of the sun or for some conditions of night driving it is found desirable to use simultaneously the entire unit such as here illustrated, the members 20 and 30 both being in down or complementing use positions as shown in Figs. 1 to 4 inclusive. Under the generality of conditions of sun glare the shield means may be employed in a position such as seen in Fig. 6, the semi-transparent member 20 being up against or substantially against the main or vizor element 15 and the shield member 30 being down in use position. Similarly, under most conditions of night driving the semi-transparent shield 20 will be adequate to take care of headlight or other glare, in which case the slotted member 30 may be in up or stored position, as represented in Fig. 7. Fig. 6 accordingly may be considered more or less typical of the adjusted position of the device for day operation under glare conditions and Fig. 7 of that for night driving, but on various occasions, as explained, all parts of the unit will be in their cooperative use positions at the one time. At other times the vizor 15 alone may be employed, while in the absence of glare the whole device may be folded up out of the way, as shown in Fig. 5.

Due to the roof formation of most modern cars the standard sun vizors corresponding to the element 15 of my device stand at a slight angle, being somewhat higher at the inboard side, so that they may be swung up flatwise against or near the roof. In such instances, and as herein illustrated, the vision slot or window 33 of the shield element 30 may be disposed at a corresponding slight angle with respect to the top and bottom edges of said shield element and of the supporting vizor 15, so that in the operating position the vision slot 33 is brought into substantial parallelism with the surface of the road.

It will be apparent that my device as a whole is readily adjustable to bring the vision slot 33 to the eye height of the driver, to give the latter a clear direct line of sight through said slot or window, as indicated by the dot-and-dash line in Fig. 2. This sight level is accurately adjustable both by raising or lowering the main element or vizor 15 about its pivotal axis 17, 17 and also by angularly adjusting the shield 30 relative to the vizor. The standard sun vizors such as previously referred to are inadequate since they are necessarily limited in their effectiveness to the field or zone above the level of the driver's eyes. But by the provision of a vision-slotted shielding means and a semi-transparent shielding means operatively associated or otherwise, and either in combination with or as a substitute for the conventional sun vizor, the driver is afforded protection against all glare conditions.

The unitary construction of the three main elements as above described and as shown in the drawings is simple, efficient and of low manufacturing cost. The entire device desirably is supplied as a unit, as standard or original equipment. The semi-transparent and the slotted shield elements, however, may be supplied as accessories or attachments for sun vizors previously in use. In such original installations as referred to said latter elements desirably are shaped and proportioned to complement each other and to conform in general to the size and shape of the main vizor element 15. It will be understood, however, that the relative proportions may be varied and that the pendant or angularly adjustable elements 20 and 30 may be of greater or less lateral extent than that of the vizor 15 and that the area of the semi-transparent member 20 relative to that of the opaque, slotted member 30 may be otherwise than as in the illustrated example, wherein the semi-transparent member is but about one-half the area of the slotted member and one-third the area of the total shielding means supplied by said two members when used conjointly.

It is desirable that the section surrounding the window and the semi-transparent section shall be adjustable to positions within approximately two feet from the driver's eyes and substantially perpendicular to the line of sight, and accordingly a hinged connection between said sections and the supporting element or vizor 15 is generally essential. In some instances, however, such connection may be dispensed with and the entire device may be embodied in one section, or only the window section or the semi-transparent section may be hinged to their supporting part.

My present invention is not limited to the particular embodiment thereof illustrated and described herein by way of example, and I set forth its scope in my following claims.

I claim:

1. In combination with the interior sun vizor for an automobile, a semi-transparent shield at an outer portion of the bottom edge of said vizor and connected thereto for pivotal movement about an axis paralleling said bottom edge, and an opaque shield similarly pivoted at another portion of the vizor bottom in side-by-side relation to said semi-transparent shield and having a substantially central, horizontally-elongated vision aperture, said shields being movable to and from use and non-use positions either independently or together as a unit and having a mutually complementary formation adapting them to cooperate as a substantially uninterrupted shielding element along the bottom of the vizor.

2. Anti-glare means for motor vehicles, comprising, in combination, a sun vizor having means for adjustably mounting it to shield a zone above the driver's eye level, a semi-transparent shield pivoted upon a substantially horizontal axis at the lower portion of the vizor at an outboard portion thereof, and a glare-shield similarly pivoted on the vizor at the inboard side of said semi-transparent shield, in side-by-side relation to it and having a substantially horizontally disposed elongated vision window, said semi-transparent shield having an inner edge portion disposed in general parallelism to a path traced thereon by a relatively approaching light source, and said windowed glare-shield being complementally formed.

EDGAR F. HATHAWAY.